United States Patent
Mackenzie et al.

(10) Patent No.: US 10,125,728 B2
(45) Date of Patent: Nov. 13, 2018

(54) PASSIVELY MANAGED HOOD AND PLENUM FED AIR INDUCTION SYSTEM WITH PARALLEL CONTAMINANT MANAGEMENT FEATURES

(71) Applicant: GM GLOBAL TECHNOLOGY OPERATIONS LLC, Detroit, MI (US)

(72) Inventors: Steven K. Mackenzie, West Bloomfield, MI (US); William C. Farrer, Burton, MI (US); Jamie L. Hamilton, Clinton Township, MI (US); David W. Turner, Algonac, MI (US); Terry C. Bishop, Chesaning, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/485,291

(22) Filed: Apr. 12, 2017

(65) Prior Publication Data

US 2018/0298856 A1    Oct. 18, 2018

(51) Int. Cl.
| | |
|---|---|
| *F02M 35/10* | (2006.01) |
| *F02M 35/16* | (2006.01) |
| *F02M 35/024* | (2006.01) |
| *F02M 35/08* | (2006.01) |
| *F01P 5/02* | (2006.01) |
| *F01P 11/02* | (2006.01) |
| *B62D 25/12* | (2006.01) |
| *B60K 13/06* | (2006.01) |
| *B60K 13/02* | (2006.01) |

(52) U.S. Cl.
CPC ......... *F02M 35/161* (2013.01); *B60K 13/02* (2013.01); *B60K 13/06* (2013.01); *B62D 25/12* (2013.01); *F01P 5/02* (2013.01); *F01P 11/02* (2013.01); *F02M 35/02416* (2013.01); *F02M 35/02491* (2013.01); *F02M 35/088* (2013.01); *F02M 35/10013* (2013.01); *F02M 35/10052* (2013.01); *F02M 35/10268* (2013.01)

(58) Field of Classification Search
CPC .......... F02M 35/161; F02M 35/02416; F02M 35/02491; F02M 35/088; F02M 35/10013; F02M 35/10052; F02M 35/10268; F01P 5/02; B60K 13/02; B60K 13/06; B62D 25/12
See application file for complete search history.

(56) References Cited

U.S. PATENT DOCUMENTS

| | | | |
|---|---|---|---|
| 9,062,639 B1* | 6/2015 | MacKenzie | F02M 35/161 |
| 2007/0175683 A1* | 8/2007 | Miyake | B60K 13/02 |
| | | | 180/69.22 |
| 2010/0083928 A1* | 4/2010 | Saito | F02M 35/02 |
| | | | 123/184.56 |
| 2016/0290215 A1 | 10/2016 | Sokol et al. | |

* cited by examiner

*Primary Examiner* — Jacob Amick
(74) *Attorney, Agent, or Firm* — Quinn IP Law

(57) ABSTRACT

An air induction system includes a hood inlet duct having a first induction inlet and an air induction plenum assembly having a second induction inlet. The air induction system also includes an air box in fluid communication with the air induction plenum and the hood inlet duct. The air box defines an inner box cavity. The air induction system also includes a panel filter disposed inside the air box, wherein the panel filter divides the inner box cavity so that the first induction inlet and the second induction inlet are upstream of the panel filter.

13 Claims, 3 Drawing Sheets

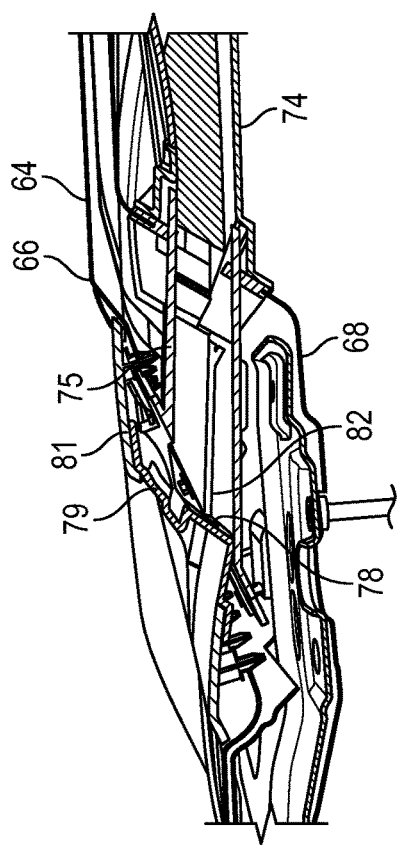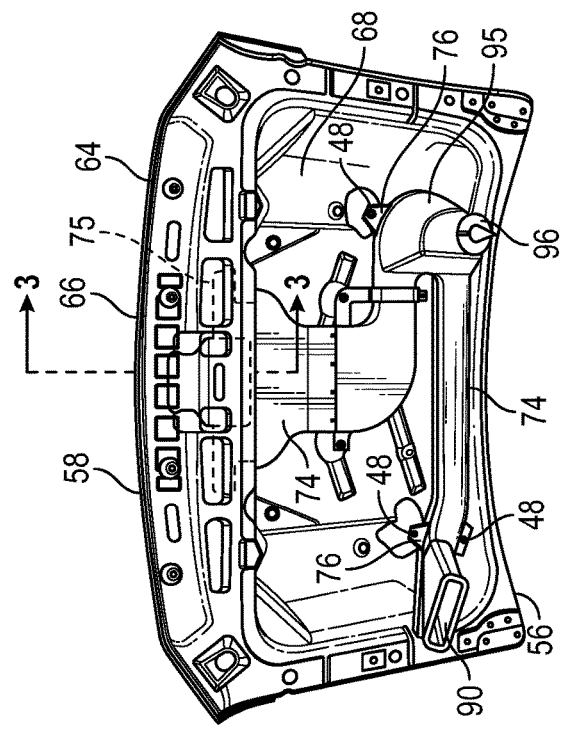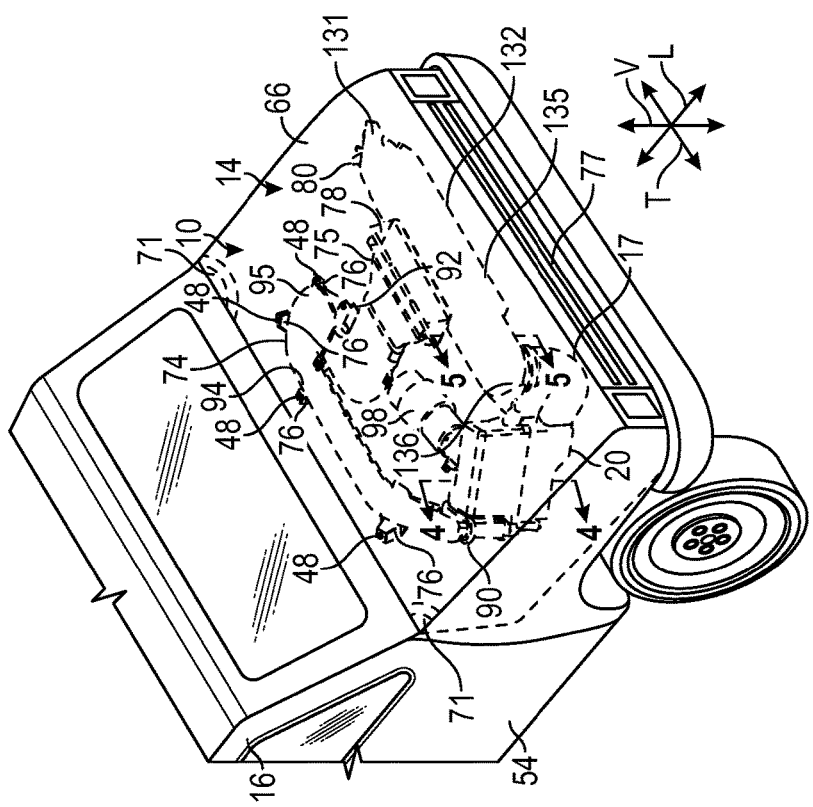

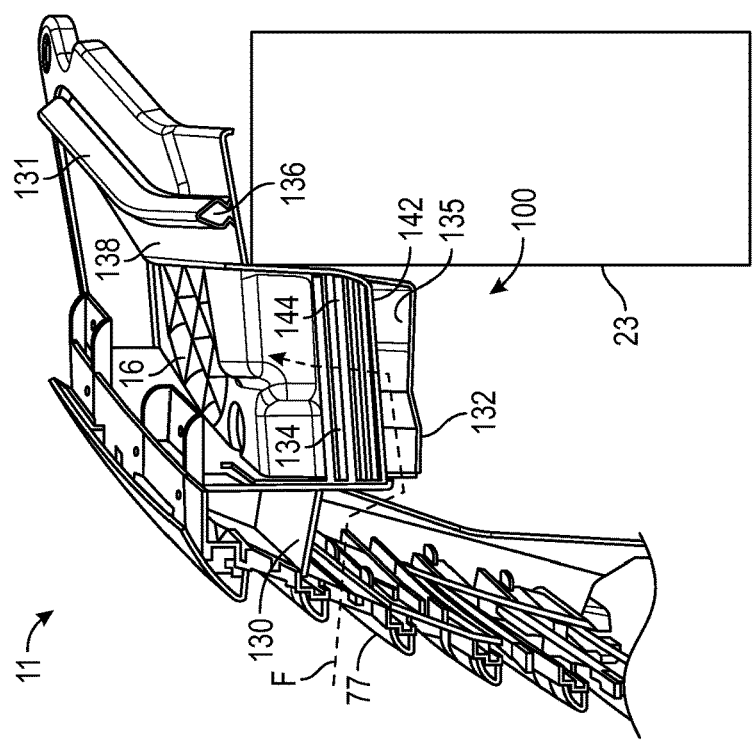
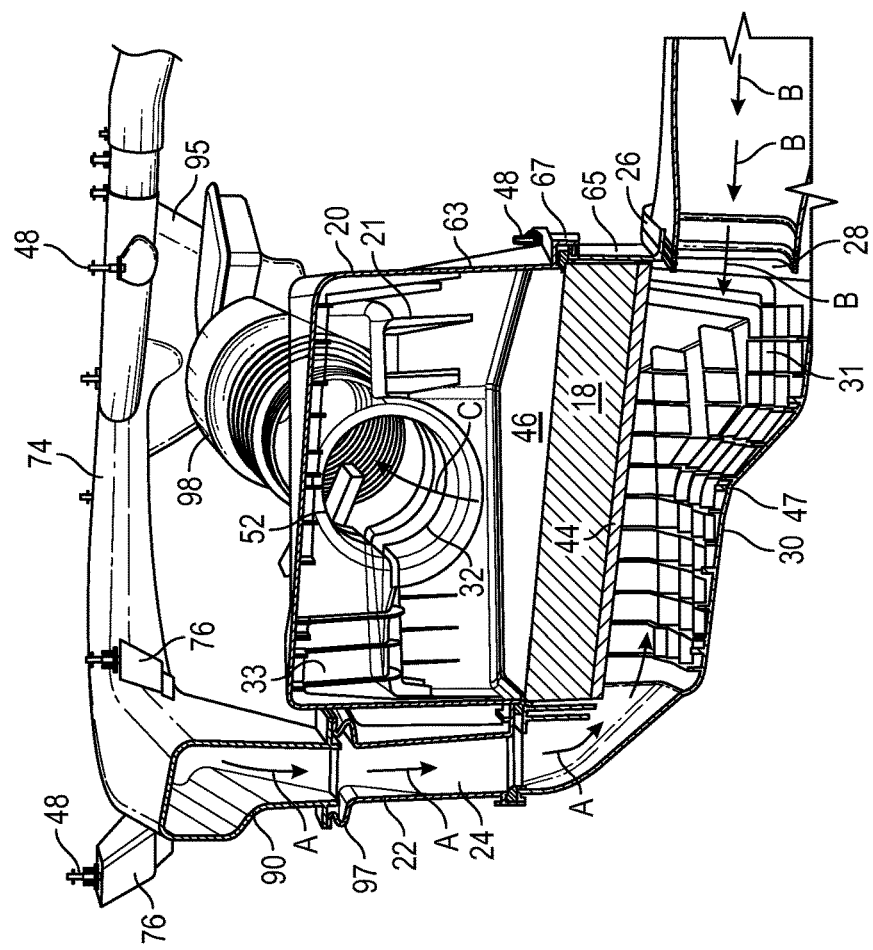

PASSIVELY MANAGED HOOD AND PLENUM FED AIR INDUCTION SYSTEM WITH PARALLEL CONTAMINANT MANAGEMENT FEATURES

INTRODUCTION

The present teachings generally relate to an air induction system. Specifically, the present teachings relates to an air induction system with a panel filter and a plenum inlet.

Engine air induction systems are designed to provide dry filtered air for combustion with fuel. Generally, engine performance is improved when the induction system delivers the lowest temperature air with the least pressure drop. Air drawn from within the engine compartment is generally at a higher temperature than air drawn from other locations. Vehicle engine compartments have higher air temperatures than their ambient surroundings.

SUMMARY

Factors such as pressure drop through the air induction system, inlet air temperature, noise, and contaminant prevention are considered in achieving an optimal design for an air induction system. Engine cooling fans reject a large amount of elevated temperature air. Engine induction systems draw in air and filter it for engine operation. It is challenging to keep elevated engine compartment air out of the induction. The presently disclosed air induction system substantially increases engine power in comparison with other induction systems by, among other things, reducing inlet air temperature when compared with other induction systems. To do so, the presently disclosed air induction system draws air from two known ambient air sources. One source is in front of the condenser, radiator, and fan module (CRFM), and the second source is through a port in the hood. The air induction system draws the same amount of air from the two ambient air sources. Dual inlet systems reduce peak inlet velocity which helps reduce inlet suction that pulls contaminants into the air induction system. This air induction system improves contaminate ingestion robustness as compared to single inlet designs. Lastly, the dual inlets are ported to the bottom side of a panel filter inside an air box. This layout enables at least one small hole in the lower surface of the air box to drain small amounts of drawn-in water or melted snow without breaching the filtered side of the induction system.

According to an aspect of the present disclosure, the air induction system includes a hood inlet duct having a first induction inlet and an air induction plenum assembly having a second induction inlet. The air induction system also includes an air box in fluid communication with the air induction plenum and the hood inlet duct. The air box defines an inner box cavity. The air induction system also includes a panel filter disposed inside the air box, wherein the panel filter divides the inner box cavity so that the first induction inlet and the second induction inlet are upstream of the panel filter. The air induction system may be part of a vehicle. The vehicle further includes an internal combustion engine, and the air induction system in fluid communication with the internal combustion engine. The vehicle further includes a condenser, radiator, and fan module (CRFM) disposed behind the air induction plenum assembly.

The panel filter may divide the inner box cavity into an unfiltered or lower side and a filtered or upper side, the hood inlet duct is in fluid communication with the unfiltered side of the inner box cavity to allow air to flow from the hood inlet duct to the unfiltered side of the inner box cavity. The air induction plenum assembly is in fluid communication with the unfiltered side of the inner box cavity to allow the air to flow from the air induction plenum assembly to the unfiltered side of the inner box cavity. The air induction plenum assembly may have an elevated curb to limit water entering the second induction inlet.

The air induction system further includes an outlet duct in fluid communication with the filtered side of the inner box cavity, wherein the outlet duct is downstream of the panel filter to allow the air to flow from the filtered side of the inner box cavity to the outlet duct.

The air induction system further includes an air inlet duct coupled between the air induction plenum assembly and the air box to allow the air to flow from the air induction plenum assembly to the air box through the air inlet duct.

The air box defines a first inlet port coupled to the hood inlet duct to allow the air to flow from the hood inlet duct into the unfiltered side of the inner box cavity through the first inlet port. The air induction system further includes a seal disposed between the first box inlet port and the hood inlet duct. The first inlet port and the second inlet port may be on opposite ends of the air box to create an even distribution across the panel filter. The hood inlet duct and the air induction plenum assembly facilitate injection of low temperature air into the air box to maximize engine performance. The air induction assembly is disposed in front of the CRFM. The hood inlet duct and the air plenum assembly are sized to provide equal flow into the first inlet port and the second inlet port of the air box. The air induction plenum assembly may include plenums to reduce air inlet velocities to minimize contaminant ingestion. The induction plenum assembly and the hood inlet duct each have a ninety degree relationship between an inlet and an outlet thereof to optimize attenuation. The hood inlet duct and the air induction plenum assembly are sized and located to minimize snow ingestion to passively correct when snow packing occurs in at least one of the hood inlet duct and the air induction plenum assembly. The hood inlet duct and the air induction plenum assembly are sized and located to passively correct an air temperature performance by drawing primary air from a duct with the lowest temperature, wherein the duct is either the hood inlet duct or the air induction plenum assembly. The air induction system passively adjusts a split of the air flow based on vehicle speed and engine cooling fan operation conditions.

The air box defines a second inlet port coupled to the air inlet duct to allow the air to flow from the air inlet duct into the unfiltered side of the inner box cavity through the second inlet port. The hood inlet duct includes an expansion chamber.

The air induction system further includes a water dump valve coupled to the expansion chamber, wherein the water dump valve is configured to remove water from the hood inlet duct.

The air induction plenum assembly extends along a transverse direction, the first induction inlet is spaced apart from the air induction assembly along the vertical direction, and the vertical direction is perpendicular to the transverse direction.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic illustration in fragmentary perspective view of the vehicle with an air induction system including a hood inlet duct secured to a vehicle hood.

FIG. 4 is a schematic illustration in cross-sectional view of the air induction system, taken along lines 4-4 of FIG. 1.

FIG. 5 is a schematic illustration in cross-sectional view of the vehicle and an air induction plenum, taken along lines 5-5 of FIG. 1.

FIG. 6 is a schematic illustration in perspective view of the vehicle hood and the hood inlet duct shown in FIG. 1.

FIG. 7 is a schematic illustration in cross-sectional view of the vehicle hood and the hood inlet duct shown in FIG. 2, taken along lines 3-3 of FIG. 6.

DETAILED DESCRIPTION

While the present disclosures may be described with respect to specific applications or industries, those skilled in the art will recognize the broader applicability of the disclosures. Those having ordinary skill in the art will recognize that terms such as "above," "below," "upward," "downward," et cetera, are used descriptively of the figures, and do not represent limitations on the scope of the disclosures. Any numerical designations, such as "first" or "second" are illustrative only and are not intended to limit the scope of the disclosures in any way. As used herein, the term substantially denotes variance from exact or perfect values. Skilled artisans recognize that relationships, ratios, or orientations are rarely exact. Therefore, for example, substantially equal may refer to variances of five-percent from exact (one-hundred percent) equality.

Figure 2:
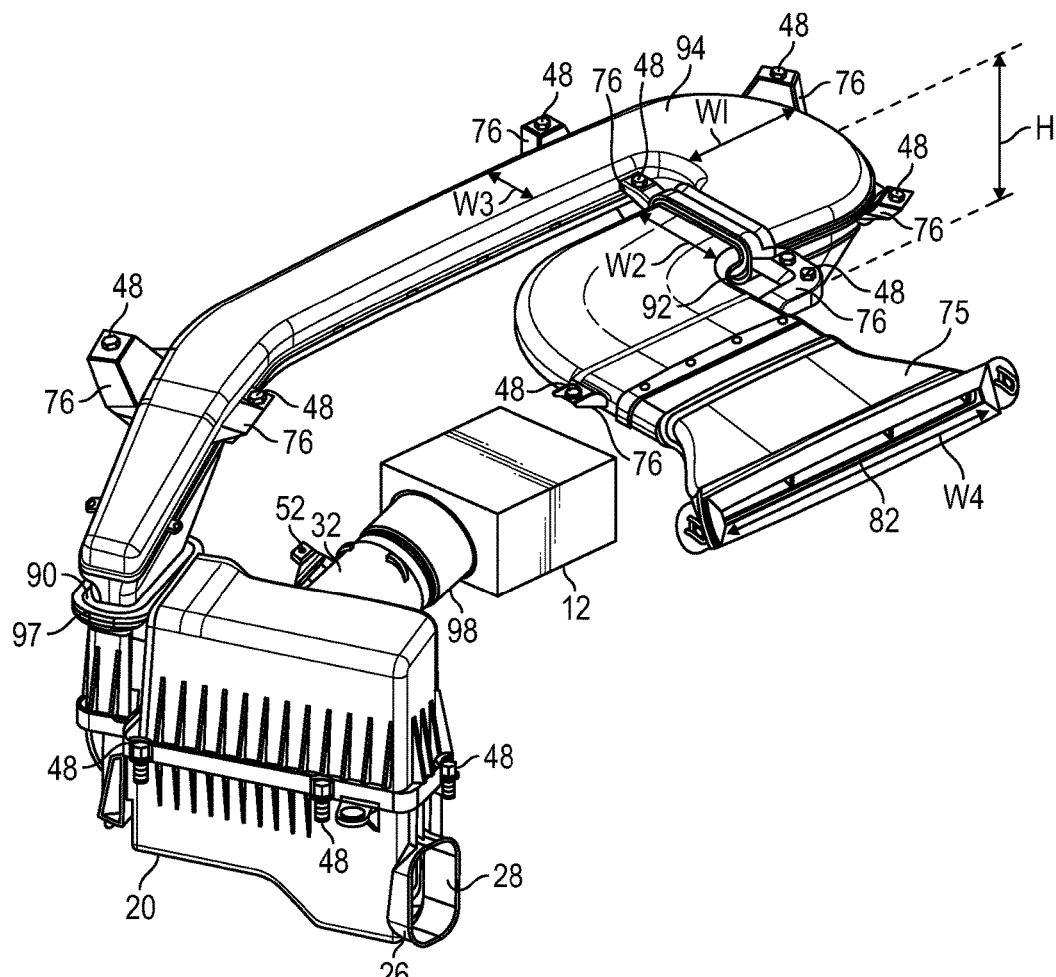
FIG. 2 is a schematic illustration in perspective view of a hood inlet duct and an air box of the air induction system shown in FIG. 1.

Referring to the drawings, wherein like reference numbers refer to like components throughout the views, FIG. 1 show a portion of a vehicle 16 with an air induction system 10 configured to provide air to a vehicle engine 12 as shown in FIG. 2. The air induction system 10 and the vehicle 16 are illustrated relative to a three-axis coordinate system. A longitudinal direction L reflects movement, position, or orientation relative to the front and back of the vehicle 16; a transverse direction T reflects movement, position, or orientation relative to the left and right sides of the vehicle 16; and a vertical direction V reflects movement, position, or orientation relative to the bottom and top (as defined by gravity or the roadway) of the vehicle 16. The transverse direction T may also be referred to as the cross-car direction. The vehicle 16 has a vehicle grille 77 and a vehicle body 54 forming the engine compartment 14 sized to receive the engine 12. The engine 12 is an internal combustion engine, such as a diesel engine. For example, the engine 12 could be a spark-ignition engine. The engine 12 may be a turbocharged diesel engine. The air is provided from two different air sources external to the engine compartment 14 of the vehicle 16. With this arrangement, pressure drop across the air induction system 10 and temperature of the air provided to the engine 12 are both reduced in comparison to an air source within the engine compartment 14, and in comparison to using only one air inlet. Additionally, a panel filter 18 is used in the air induction system 10, rather than a cylindrical filter, as shown in FIG. 4. Panel filters are typically less expensive than cylindrical filters, but may require more packaging space to achieve the same amount of filtered area. However, with the air induction system 10 as described herein, the panel filter 18 is positioned to minimize packaging space requirements in the engine compartment 14. Air upstream from the panel filter 18 may be referred to as dirty air, and air downstream of the panel filter 18 may be referred to as clean air.

Referring to FIGS. 1, 2, 3, and 4, the air induction system 10 includes an air box 20 that defines an inner box cavity 21. The air box 20 may alternatively be referred to as a housing. The air box 20 can be multiple integrally attached box portions. The air box 20 has a first wall 22 defining a first inlet port 24, and a second wall 26 with a second inlet port 28. The first wall 22 is positioned at an angle with respect to the second wall 26. This enables the first inlet port 24 to be generally orthogonal to the second inlet port 28. The air box 20 also has a bottom wall 30, which is configured to be positioned lower than the first inlets port 24 when the air box 20 is secured in the vehicle 16. The air box 20 also forms an outlet port 32 for directing air to the engine 12. An outlet duct 98 connects the air box 20 at the outlet port 32 to the engine 12. The outlet duct 98 may have bellows portions. The air box 20 is secured to the vehicle 16 with isolated attachments that snap or otherwise attach to a tray supported by a portion of the vehicle body and/or the vehicle frame with one or more brackets. As a non-limiting example, the air box 20 may solely include the first inlet port 24 and the second inlet port 28 to minimize part count. In other words, the air box 20 may solely include two inlet ports (i.e., the first inlet port 24 and the second inlet port 28). Accordingly, air may flow into the air box 20 solely through the first inlet port 24 and the second inlet port 28. The first inlet port 24 and the second inlet port 28 are on opposite ends of the air box 20 to create even air distribution across the of the panel filter 18. Further, the air may flow out of the air box 20 solely through the outlet port 32 to minimize part count. Thus, the air box 20 may solely include the outlet port 32. In other words, the air box 20 may solely include a single outlet port (i.e., outlet port 32).

The air induction system 10 includes the panel filter 18 supported by the air box 20 to divide the inner box cavity 21 into an unfiltered side 31 and a filtered side 33, and require air to flow through the panel filter 18 to reach the outlet port 32 from either of the first inlet port 24 or the second inlet port 28. In the depicted embodiment, the panel filter 18 is oriented horizontally. The panel filter 18 may include a pleated membrane and is supported by first and second box portions 63, 65 via a first seal 67. The first seal 67 serves as a sealing support generally around the periphery of the panel filter 18. Fasteners 48 extend through portions of the air box to secure the first box portion 63 to the second box portion 65. Alternatively, the first box portion 63 and the second portions 63, 65 could be hinged or clamped to one another. The filter seal 67 may be compressed between the box portions 63, 65 at the interface. In other embodiments, a support frame may be positioned to support the panel filter, and the seal 67 can attach the support frame to the box portions 63, 65. A "panel filter" such as panel filter 18 is generally box-shaped, and allows air to flow in a continuous direction through the filter, as opposed to a cylindrical filter in which air flows through the filter from an external cavity to an internal cavity, or vice-versa. Thus, the panel filter 18 is not cylindrical.

The panel filter 18 has a first side 44 facing the unfiltered side 31 of the inner box cavity 21, and a second side 46 facing the filtered side 33 of the inner box cavity 21. The filtered side of the inner box cavity 21 may be referred to as the upper side of the inner box cavity 21 of the air box 20. The panel filter 18 is mounted within the air box 20 and divides the inner box cavity 21 so that the first inlet port 24 and the second inlet port 28 are upstream of the panel filter 18, and the outlet port 32 is downstream of the panel filter 18. Air flows through the air box 20 from either of the first inlet port 24 or the second inlet port 28 to the outlet port 32, and through the panel filter 18 from the first side 44 to the second side 46. Air flow from the first inlet port 24 is represented by arrows A. Air flow from the second inlet port 28 is represented by arrows B. Air flow from the outlet port 32 is represented by arrows C. The first inlet port 24 and the second inlet port 28 are positioned such that the inlet air enters below the panel filter 18. Thus, the panel filter 18 is positioned so that unfiltered air from the first inlet port 24 and the second inlet port 28 enters the panel filter 18 from below the panel filter 18. With both the first inlet port 24 and the second inlet port 28 on the first side 44 of the panel filter 18, contaminants will be separated from the air flow prior to the air exiting the air box 20 through the outlet port 32. A mass air flow sensor 52 is secured to the air box 20 so that it extends into the air flow exiting the air box 20. The mass air flow sensor 52 also extends outside of the air box 20, as shown in FIG. 4, and is operatively connected by wires (not shown) to an engine controller (not shown) and provides mass air flow data used by the controller to control the engine 12. This arrangement could also be used for air induction systems which do not use mass air flow sensing for engine control.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The panel filter 18 is spaced from the bottom wall 30, and is positioned above the bottom wall 30. Any moisture filtered out of the air flow by the panel filter 18 will collect at the bottom wall 30. A drain opening 47 is provided in the bottom wall 30. Because the panel filter 18 is spaced from the bottom wall 30, it will be removed from any pooled moisture, and will not act as a wick. The panel filter 18 is positioned so that the air box 20 adjacent the first side 44 is at an oblique angle relative to the bottom wall 30 to optimizing packaging inside the air box 20.

As shown in FIGS. 1 and 6, a hood 64 is connected to the vehicle body 54 such as by pivoting hinges 71 at a rearward side of the hood 64. The hood 64 can move to a closed position to cover the engine compartment 14. The hood 64 has a hood outer panel 66 and a hood inner panel 68 joined to the hood outer panel 66. The hood inner panel 68 is generally in closer proximity to the engine compartment 14 than the hood outer panel 66 when the hood 64 is closed. The hood 64 also defines an innermost hood edge 56 and opposing, outermost hood edge 58. The outermost hood edge 58 is closer to the vehicle grille 77 than the innermost hood edge 56.

Relatively low temperature outside air is provided to the first inlet port 24 through the hood 64 and through a hood inlet duct 74 secured to an underside of the hood inner panel 68. Specifically, referring to FIGS. 1, 2, 4, and 7, the hood inlet duct 74 is secured to the bottom of the hood inner panel 68 by fasteners 48 such as bolts or "fir tree" fasteners that extend through tabs 76 around a periphery of the hood inlet duct 74 into fastener openings in the hood inner panel 68. The tabs 76 may be referred to as hood duct isolators, because these tabs 76 isolate the hood inlet duct 74 from the hood 64. The hood inlet duct 74 is coupled to the underside of the hood 64, but it is not integrated with the hood 64. As a non-limiting example, the first inlet port 24 is solely coupled to the hood inlet duct 74 to allow the air to flow from the hood inlet duct 74 into the unfiltered side 31 of the inner box cavity 21 through the first inlet port 24 to minimize part count.

The hood inlet duct 74 has a first induction inlet 75 disposed between the hood outer panel 66 and the hood inner panel 68. The first induction inlet 75 has a tapered configuration. Specifically, a width W4 of the first induction inlet 75 decreases in a direction away from a hood grille 79. In addition to the hood grille 79, the hood 64 has a bezel 81 supporting the hood grille 79. The hood grille 79 defines a hood forward-facing opening 78 (shown in FIG. 7) through which air is directed to a hood forward-facing opening 78 between the hood inner panel 68 and the hood outer panel 66. The bezel 81 can be secured to the hood outer panel 66 around the hood forward-facing opening 78. The hood inlet duct 74 has a duct forward-facing opening 82 aligned with the the hood forward-facing opening 78 so that air from outside of the vehicle 16 is directed through the hood forward-facing opening 78 of the hood 64 into the hood inlet duct 74 through the duct forward-facing opening 82. The size of the hood forward-facing opening 78 is larger than the size of the duct forward-facing opening 82 to accommodate mesh coverage so the functional area does not constrict the flow. Internally, the hood forward-facing opening 78 may have vertical flow straighteners that help normalize the flow velocity that enters the air induction system. In other embodiments, the hood 64 could be configured to route air from the hood forward-facing opening 78 to the duct forward-facing opening 82. An expansion chamber(s) 95 in the hood inlet duct 74 can be sized to attenuate certain induction noise frequencies.

As shown in FIGS. 1, 2, 4, and 6, the hood inlet duct 74 winds in a serpentine path from the hood forward-facing opening 80 to a hood duct exit 90 of the hood inlet duct 74. A second seal 97 directly interconnects the hood duct exit 90 of the hood inlet duct 74. As such, no structure of the hood needs to be used to direct air from the hood inlet duct 74 to the air box 20, thereby facilitating manufacturing and assembly of the air induction system 10. The hood inlet duct 74 has at least a first bend 92 and a second bend 94. As discussed above, the hood inlet duct 74 is configured with an expansion chamber 95, which having an expanded flow area between the duct forward-facing opening 82 and the exit opening 90. A width W1 of the hood inlet duct 74 in the expansion chamber 95 between the bends 92, 94 is larger than a width W2 of the hood inlet duct 74 upstream of first bend 92 and a width W3 of the hood inlet duct 74 downstream of second bend 94. The height H of the hood inlet duct 74 at the expansion chamber 95, shown in FIG. 2, is greater than the height of in all other areas of the hood inlet duct 74. Accordingly, a flow area at the expansion chamber will be greater than a flow area at all other parts of the hood inlet duct 74. The greater flow area helps to reduce the flow rate through the portion of the hood inlet duct 74 between the first bend 92 and the second bend 94. The reduced flow rate provides greater time for contaminants to settle out of the air flow in the section between the first bend 92 and the second bend 94. A water dump valve 96 is located in the bottom side of the expansion chamber 95 of the hood inlet duct 74 with the expanded flow area to expel fluid or other contaminants (e.g., melted snow) from the air flow. Because the hood inlet duct 74 is fastened to the underside of the hood inner panel 68, it can be detached and cleaned, if desired. The hood inlet duct 74 can be plastic to avoid corrosion due to entrained moisture. For example, the hood inlet duct 74 can be injection-molded plastic. The hood inlet duct 74 can be molded with external ribs to increase stiffness. Additionally, the hood inlet duct 74 can be formed in multiple pieces that interconnect. The hood inlet duct 74 and the first inlet port 24 and the second inlet port 28 are configured to provide an optimal mix of air from the hood forward-facing opening 78, as air from outside of the hood 64 will be lower in temperature than air inside the engine compartment 14. The fluidity of the hood inlet duct 74 is completed when the hood 64 is closed.

Figure 3:
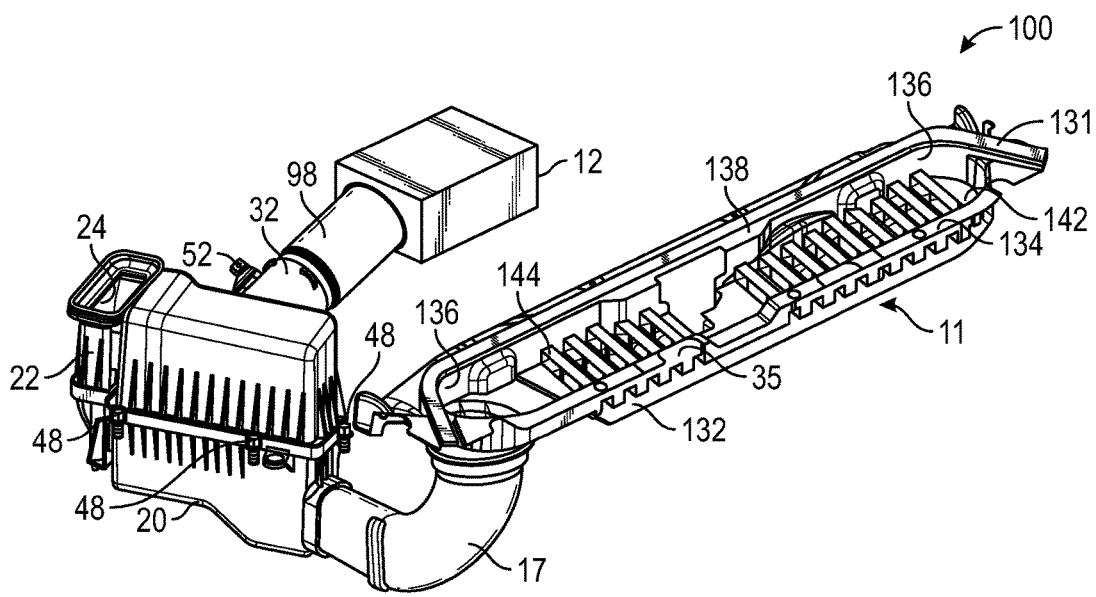
FIG. 3 is a schematic illustration in perspective view of an air box, an air inlet duct, and an air induction plenum of the air induction system shown in FIG. 1.

The outlet duct 98 is secured to the outlet port 32 and is configured to route air from the outlet port 32 to the engine 12. As shown in FIGS. 3 and 4, the hood inlet duct 74 is positioned above the outlet duct 98. One or more tuning devices can be secured to the outlet duct 98 and/or form part of the flow path from the outlet port 32 to the engine 12. A hiss resonator and a sound tuner can be coupled to the outlet duct 98 to reduce engine noise. An end of the outlet duct 98 connects to either a throttle body or turbo charger to provide air to the engine 12.

The relatively low air inlet temperature and relatively low pressure drop achievable by use of the air induction system with the dual inlet housing can improve vehicle metrics, such as hill climb time, engine performance with hill climb in extreme temperatures, and engine performance in stop-and-go city traffic. Testing shows a reduction in engine inlet air temperature in comparison to air drawn from the engine compartment. Testing has shown increased horsepower and decreased charge air cooler thermal load. An increase in horsepower was demonstrated during a trailering load event in comparison to a vehicle ingesting air sourced from the engine compartment. Charge air cooler thermal load was also reduced. Additionally, with the unfiltered side (i.e., the "dirty side" or the "lower side") of the inner cavity formed in the housing being positioned low in the housing, water and debris ingestion in air flow to the engine is reduced. The dual inlet design can provide a greater inlet flow area, which reduces air flow velocity in comparison to a single inlet of smaller inlet flow area. Reduced air flow velocity can decrease contaminant ingestion. Additionally, the dual inlet design provides an auxiliary path if the flow through one of the first inlet port 24 or the second inlet port 28 is obstructed. During operation, the air induction system 10 passively balances the performance for contaminants to temperature while still maintaining high performance. In addition, the dual inlet design of the air induction system 10 provides an emergency path for airflow if the one inlet is obstructed and also optimizes peak performance while passively balancing performance during both hot and cold weather performance. During cold weather, when the first airflow path becomes obstructed with snow, the air induction system 10 will draw air from the second path, but the second path is an equivalently sized path than the first path, not an emergency one. Therefore, the air induction system 10 effectively slows down the snow ingestion through the first path while also increasing temperature to melt out any snow that gets in from the first path. At high temperature operation, when the underhood temperatures are high, as the vehicle 16 slows down the air induction system 10 will pull colder air from the hood path and not from the CRFM path because of the fan suction on the first CRFM path. Thus, the air induction system 10 balances itself for temperatures in high ambients and contaminants at low ambients. Other systems do one or the other but because of the unique layout and system balance, the presently disclosed air induction system 10 does both.

FIGS. 1, 3, 4, and 5 show an air induction plenum 35 defining a second induction inlet 11. An air inlet duct 17 in fluid communication with the air box 20 and the air induction plenum assembly 100. In the depicted embodiment, the air inlet duct 17 directly interconnects the air induction plenum assembly 100 and the air box 20. As a non-limiting example, the second inlet port 28 is solely coupled to the air inlet duct 17 to allow the air to flow from the air inlet duct 17 into the unfiltered side 31 of the inner box cavity 21 through the second inlet port 28 to minimize part count. For instance, the second inlet port 28 may be directly coupled to the air inlet duct 17 to minimize part count. A condenser, radiator, and fan module (CRFM) 23 is also shown schematically in FIG. 5. Air passes through the CRFM 23 into the engine compartment 14. The air induction plenum 35 is above and in front of the CRFM 23 to allow the air induction plenum assembly 100 to draw low temperature air in order to optimize engine performance. Thus, the air induction plenum assembly 100 is located above and in front of the CRFM 23. In other words, the CRFM 23 is disposed adjacent the induction plenum 35 to allow the air induction plenum assembly 100 to draw low temperature air in order to optimize engine performance. The hood inlet duct 74 and the air induction plenum assembly 100 are similarly sized to provide equal flow into the air box 20. Therefore, the air induction system 10 is not a dual-duct system with a primary duct and a limited auxiliary branch. Rather, the hood inlet duct 74 and the air induction plenum assembly 100 are sized to allow equal flow into the air box 20. Therefore, the flow entering the first inlet port 24 via the hood inlet duct 74 is equal to the flow entering the second inlet port 28 via the air induction plenum assembly 100 to passively balance performance during cold and hot ambients. Each of the hood inlet duct 74 and the air induction plenum assembly 100 may have a ninety degree relationship between the inlet and outlet for optimal attenuation.

Air provided by the second induction inlet 11 is used for combustion by the engine 12. Factors such as pressure drop, inlet air temperature, air outlet temperature, noise, contaminant prevention, and moisture separation are considered in achieving an optimal design for the second induction inlet 11. Generally, performance of the engine 12 is improved when the second induction inlet 11 delivers the lowest temperature air with the least pressure drop between the inlet and outlet of the air induction system 10. Air drawn from the engine compartment is generally at a higher temperature than air drawn from other locations, such as the front of the vehicle 16, because engine compartments have higher air temperatures than compared to outside ambient air. However, ambient air is more likely to include moisture, including rain, snow, or road splash. The second induction inlet 11 improves performance of the vehicle 16 by delivering a high volume of relatively clean, dry air with little pressure drop.

FIG. 5 shows a cross-sectional view of a portion of the vehicle 16, including the second induction inlet 11, taken generally along a line 5-5 of FIG. 1. The second induction inlet 11 includes multiple stages, each of which alters the direction of airflow through the air induction system 10. Changes in direction of airflow promote removal of moisture, such as rain and snow, as the air moves through the second induction inlet 11 toward the air inlet duct 17. The components defining the second induction inlet 11 are referred to as air induction plenum assembly 100. The air induction plenum assembly 100 extends (i.e., is elongated) along the transverse direction T (i.e., the cross-car direction).

As shown in FIGS. 1, 3, and 5, the air induction plenum assembly 100 includes a front baffle 130, which redirects air coming from the front of the vehicle 16 into a first stage of the second induction inlet 11. The first stage of the second induction inlet 11 is formed between an inlet baffle 132 and an inlet panel 134.

The first stage occurs within an inlet plenum 135 defined between, and substantially bounded or framed by, the inlet baffle 132 and the inlet panel 134. As used herein, the term "plenum" means a space volume that is substantially enclosed and can serve as a holding or receiving chamber for air being distributed to other areas of the vehicle 16.

A second stage of the second induction inlet 11 is formed by the inlet panel 134, and a third stage of the second induction inlet 11 is formed by an outlet plenum 136 defined above the inlet panel 134. The outlet plenum 136 is the space or volume providing airflow communication between the inlet panel 134 and the air inlet duct 17.

An outlet baffle 138 extends above the inlet panel 134. In some configurations, the outlet baffle 138 may be formed as one piece with the inlet panel 134.

The inlet baffle 132 is shown below the inlet panel 134 and the outlet baffle 138 is shown above the inlet panel 134, such that air flows from bottom to top through the inlet panel 134. However, the relative locations of the inlet baffle 132 and the outlet baffle 138 may be reversed, such that air flows from top to bottom through the inlet panel 134.

The outlet plenum 136 is a substantially enclosed volume holding air. In the configuration shown, the outlet plenum 136 is defined or bounded by the inlet panel 134, the outlet baffle 138, the front baffle 130, and the vehicle hood 64. However, additional seals, panels, or other structures may further define the outlet plenum 136 and/or the outlet baffle 138. In the depicted embodiment, a third seal 131 is disposed on (and secured to) the outlet baffle 138 to prevent air from escaping the air induction plenum assembly 100. The third seal 131 contacts the vehicle hood 64. As a result, inlet air is directed to enter the air induction plenum assembly through the inlet baffle 132.

Fresh air from the front of the vehicle 16 enters the inlet plenum 135 of the air induction plenum assembly 100 from above (and in front of) the CRFM 23, and that there is little or no airflow from near the engine 12. Therefore, heat generated by the engine 12 and heat radiated by the CRFM 23 is not passed to the air flowing into the air induction plenum assembly 100. Thus, the CRFM 23 is disposed behind and below the air induction plenum assembly 100. Accordingly, the vehicle grille 77 is closer to the air induction plenum assembly 100 than to the CRFM 23.

The inlet panel 134 includes a plurality of first longitudinal keys or first keys 142 and a plurality of second longitudinal keys or second keys 144. The first keys 142 and the second keys 144 are elongated slats, strips, laths, or ribs. The second keys 144 are vertically offset from the first keys 142 and are also transversely offset relative to the first keys 142 to direct airflow toward the air inlet duct 17.

The inlet baffle 132 is below the inlet panel 134 and receives air from the front of the vehicle 16, such as through the vehicle grille 77 of the vehicle 16. Air enters the air induction plenum assembly 100 moving longitudinally into the inlet baffle 132 below the inlet panel 134, possibly after redirection by the front baffle 130.

After entering the inlet baffle 132, air must turn from moving substantially longitudinally to moving substantially vertically in order to enter the inlet panel 134, which defines a second stage of the air induction plenum assembly 100.

During operation of the air induction plenum assembly 100, air enters the front of the vehicle 16 and moves into the inlet baffle 132, as illustrated by an exemplary flow path F. In the inlet baffle 132, air is moving substantially longitudinally, but needs to make a right-angle turn in order to enter the inlet panel 134. This change of direction causes separation of moisture, such as rain and snow, from the air. The momentum of the moisture continues longitudinally as the air moves vertically toward the inlet panel 134.

Air moves substantially vertically between the first keys 142. The second keys 144 force the air to make another right-angle turn (toward either the left or right side of the vehicle 16).

Therefore, the inlet panel 134, as the second stage of the air induction plenum assembly 100, causes airflow to make at least two right-angle turns, each of which promotes additional separation of moisture from the air. As the airflow leaves the inlet panel 134 and enters the outlet plenum 136, as the third stage, it makes either another right-angle turn or a one-hundred-eighty degree turn toward the air inlet duct 17.

Moisture removed by each change of direction falls downward and drains through the inlet panel 134, which effectively has a drain grate formed by the first keys 142 and the second keys 144. Additionally, the air induction plenum assembly 100—particularly the inlet plenum 135 and the outlet plenum 136—reduces the velocity of airflow flowing toward the air inlet duct 17. Generally, lower velocities are beneficial for dropping moisture of the airstream.

Alternatively stated, each stage of the air induction plenum assembly 100 causes at least one change of direction that promotes separation of moisture from the airflow. In the first stage, formed by the inlet baffle 132, the air is changed from substantially longitudinal flow to substantially vertical flow. In the second stage, formed by the inlet panel 134, the air is changed from substantially vertical flow to substantially transverse flow, and back to substantially vertical flow. In the third stage, formed by the outlet baffle 138, the air is changed from substantially vertical flow to substantially transverse flow as it moves toward the air inlet duct 17. Depending on the orientation of the air inlet duct 17, an additional change of direction may occur.

The inlet plenum 35 is front facing relative to the vehicle 16. The front-facing orientation results in increased pressure of the air entering or filling the inlet plenum 35, even receiving ram air while the vehicle 16 is moving at speed. Increased pressure, relative to ambient pressure, reduces vacuum relative to the engine compartment. Other systems may have a higher vacuum that could result in pulling hot air from the engine compartment into the induction duct.

However, the front-facing orientation may also result in an increased likelihood of moisture being pulled into the air induction plenum assembly 100, such that the changes of direction caused by the offset flow sections are used to remove moisture from the air flow prior to the air inlet duct 17. Noise, vibration, and harshness is also reduced by the multiple stages, as there is no direct path between the air inlet duct 17 and the exterior of the vehicle 16 and multiple pre-plenums are formed by the stages of the air induction plenum assembly 100. The air induction plenum assembly 100 includes enlarged areas or plenums to reduce air inlet velocities to minimize contaminant ingestion.

In order to reduce the constriction of airflow, and to minimize pressure drop, the air induction plenum assembly 100 maintains relatively high volumetric flow at low velocity. Furthermore, the total area of each of the flow sections is larger than the cross-sectional area of the air inlet duct 17.

While the best modes for carrying out the teachings have been described in detail, those familiar with the art to which this disclosure relates will recognize various alternative designs and embodiments for practicing the teachings within the scope of the appended claims. The air induction system 10 illustratively disclosed herein may be suitably practiced in the absence of any element which is not specifically disclosed herein. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings.

The invention claimed is:

1. An air induction system, comprising:
   a hood inlet duct having a first induction inlet;
   an air induction plenum assembly having a second induction inlet;
   an air box in fluid communication with the air induction plenum assembly and the hood inlet duct, wherein the air box defines an inner box cavity; and
   a panel filter disposed inside the air box, wherein the panel filter divides the inner box cavity so that the first induction inlet and the second induction inlet are upstream of the panel filter;
   an air inlet duct coupled between the air induction plenum assembly and the air box;
   wherein the air box defines a first inlet port coupled to the hood inlet duct;
   wherein the air box defines a second inlet port coupled to the air inlet duct; and
   wherein the first inlet port and the second inlet port are on opposite ends of the air box to create an even air distribution across the panel filter.

2. The air induction system of claim 1, wherein the panel filter divides the inner box cavity into a lower side and a upper side, the hood inlet duct is in fluid communication with the lower side of the inner box cavity to allow air to flow from the hood inlet duct to the lower side of the inner box cavity of the air box, and the air induction plenum assembly is in fluid communication with the lower side of the inner box cavity to allow the air to flow from the air induction plenum assembly to the lower side of the inner box cavity of the air box.

3. The air induction system of claim 2, further comprising an outlet duct in fluid communication with the upper side of the inner box cavity, wherein the outlet duct is downstream of the panel filter to allow the air to flow from the upper side of the inner box cavity to the outlet duct.

4. The air induction system of claim 3, further comprising an air inlet duct coupled between the air induction plenum assembly and the air box to allow the air to flow from the air induction plenum assembly to the air box through the air inlet duct, and the air induction plenum assembly has an elevated curb to limit water entering the second induction inlet.

5. The air induction system of claim 4, wherein the air box defines a first inlet port coupled to the hood inlet duct to allow the air to flow from the hood inlet duct into the lower side of the inner box cavity through the first inlet port.

6. The air induction system of claim 5, further comprising a seal disposed between the first inlet port and the hood inlet duct.

7. An air induction system, comprising:
   a hood inlet duct having a first induction inlet;
   an air induction plenum assembly having a second induction inlet;
   an air box in fluid communication with the air induction plenum assembly and the hood inlet duct, wherein the air box defines an inner box cavity;
   a panel filter disposed inside the air box, wherein the panel filter divides the inner box cavity so that the first induction inlet and the second induction inlet are upstream of the panel filter;
   wherein the panel filter divides the inner box cavity into a lower side and a upper side, the hood inlet duct is in fluid communication with the lower side of the inner box cavity to allow air to flow from the hood inlet duct to the lower side of the inner box cavity of the air box, and the air induction plenum assembly is in fluid communication with the lower side of the inner box cavity to allow the air to flow from the air induction plenum assembly to the lower side of the inner box cavity of the air box;
   wherein the air induction system further includes an outlet duct in fluid communication with the upper side of the inner box cavity, wherein the outlet duct is downstream of the panel filter to allow the air to flow from the upper side of the inner box cavity to the outlet duct;
   wherein the air induction system further includes an air inlet duct coupled between the air induction plenum assembly and the air box to allow the air to flow from the air induction plenum assembly to the air box through the air inlet duct, and the air induction plenum assembly has an elevated curb to limit water entering the second induction inlet;
   wherein the air box defines a first inlet port coupled to the hood inlet duct to allow the air to flow from the hood inlet duct into the lower side of the inner box cavity through the first inlet port;
   wherein the air induction system further includes a seal disposed between the first inlet port and the hood inlet duct; and
   wherein the air box defines a second inlet port coupled to the air inlet duct to allow the air to flow from the air inlet duct into the lower side of the inner box cavity through the second inlet port, and the first inlet port and the second inlet port are on opposite ends of the air box to create an even air distribution across the panel filter.

8. The air induction system of claim 7, wherein the hood inlet duct includes an expansion chamber, the hood inlet duct and the air induction plenum assembly facilitate injection of low temperature air into the air box to maximize engine performance.

9. The air induction system of claim 8, further comprising a water dump valve coupled to the expansion chamber, wherein the water dump valve is configured to remove water from the hood inlet duct.

10. The air induction system of claim 9, wherein the air induction plenum assembly extends along a transverse direction, the first induction inlet is spaced apart from the air induction plenum assembly along a vertical direction, and the vertical direction is perpendicular to the transverse direction.

11. A vehicle, comprising:
    an internal combustion engine;

an air induction system in fluid communication with the internal combustion engine, wherein the air induction system includes:
  a hood inlet duct having a first induction inlet;
  an air induction plenum assembly defining a second induction inlet;
  an air box in fluid communication with the air induction plenum assembly and the hood inlet duct, wherein the air box defines an inner box cavity;
  a panel filter disposed inside the air box, wherein the panel filter divides the inner box cavity so that the first induction inlet and the second induction inlet are upstream of the panel filter;
  a condenser, radiator, and fan module (CRFM) disposed adjacent the air induction plenum assembly, wherein the air induction plenum assembly is disposed in front of the CRFM;
wherein the panel filter divides the inner box cavity into an unfiltered side and a filtered side, the hood inlet duct is in fluid communication with the unfiltered side of the inner box cavity to allow air to flow from the hood inlet duct to the unfiltered side of the inner box cavity, and the air induction plenum assembly is in fluid communication with the unfiltered side of the inner box cavity to allow the air to flow from the air induction plenum assembly to the unfiltered side of the inner box cavity;
wherein the air induction system includes an outlet duct in fluid communication with the filtered side of the inner box cavity, wherein the outlet duct is downstream of the panel filter to allow the air to flow from the filtered side of the inner box cavity to the outlet duct;
wherein the air induction system includes an air inlet duct coupled between the air induction plenum assembly and the air box to allow the air to flow from the air induction plenum assembly to the air box through the air inlet duct;
wherein the air box defines solely a first inlet port and a second inlet port, the first inlet port is solely coupled to the hood inlet duct to allow the air to flow from the hood inlet duct into the unfiltered side of the inner box cavity through the first inlet port, the second inlet port is solely coupled to the air inlet duct to allow the air to flow from the air inlet duct into the unfiltered side of the inner box cavity through the second inlet port, and the hood inlet duct and the air induction plenum assembly are sized to provide equal flow into the first inlet port and the second inlet port;
wherein each of the hood inlet duct and the air induction plenum assembly have a ninety degree relationship between an inlet and outlet thereof to optimize attenuation;
wherein the second inlet port is directly coupled to the air inlet duct to allow the air to flow from the air inlet duct into the unfiltered side of the inner box cavity through the second inlet port, and the air box includes a single outlet port; and
wherein the air induction plenum assembly includes plenums to reduce air inlet velocities to minimize contaminant ingestion.

12. The vehicle of claim 11, wherein the air induction system includes a water dump valve coupled to an expansion chamber, wherein the water dump valve is configured to remove water from the hood inlet duct, and the hood inlet duct and the air induction plenum assembly are sized and located to minimize snow ingestion to passively correct when snow packing occurs in at least one of the hood inlet duct and the air induction plenum assembly.

13. The vehicle of claim 12, wherein the air induction plenum assembly and the hood inlet duct are sized and located to passively correct an air temperature performance by drawing primary air from a duct with the lowest temperature, and the duct includes the hood inlet duct and the air induction plenum assembly, and the air induction system passively adjusts a split of the air flow based on vehicle speed and engine cooling fan operation conditions.

* * * * *